United States Patent

Burke, Jr.

[15] 3,700,690

[45] Oct. 24, 1972

[54] SILICA PIGMENTS AND ELASTOMER-SILICA PIGMENT MASTERBATCHES AND PRODUCTION PROCESSES RELATING THERETO

[72] Inventor: Oliver W. Burke, Jr., 1510 S.W. 13th Court, P.O. Box 2266, Fort Lauderdale, Fla. 33061

[22] Filed: Jan. 11, 1972

[21] Appl. No.: 216,948

Related U.S. Application Data

[60] Continuation-in-part of Ser. No. 55,384, July 16, 1970, and a continuation-in-part of Ser. No. 55,476, July 16, 1970, abandoned, which is a continuation-in-part of Ser. No. 798,215, Sept. 16, 1968, abandoned, which is a division of Ser. No. 611,250, Jan. 24, 1967, Pat. No. 3,523,096, which is a continuation-in-part of Ser. No. 458,420, May 24, 1965, abandoned, and a continuation-in-part of Ser. No. 458,379, May 24, 1965, abandoned, and a continuation-in-part of Ser. No. 479,806, Aug. 16, 1965, Pat. No. 3,401,017.

[52] U.S. Cl....260/33.6 AO, 106/308 N, 260/41.5 R, 260/41.5 A, 260/41.5 MP
[51] Int. Cl............................C08c 11/10, C08k 1/08
[58] Field of Search..260/33.6 AO, 41.5 A, 41.5 PM, 260/41.5 R; 106/308 N

[56] References Cited

UNITED STATES PATENTS

| | | | |
|---|---|---|---|
| 3,392,140 | 7/1968 | Moahs et al. | 260/41.5 |
| 3,172,726 | 3/1965 | Burke et al. | 23/182 |
| 3,250,594 | 5/1966 | Burke et al. | 23/182 |
| 2,663,650 | 12/1953 | Iler | 106/308 |
| 3,014,810 | 12/1961 | Dybalski et al. | 106/308 |
| 2,821,232 | 1/1958 | Wolf | 152/330 |
| 2,607,753 | 8/1952 | Adams | 260/41 |

OTHER PUBLICATIONS

Whitby G. S., Synthetic Rubber, John Wiley & Sons, Inc., New York, 1954, pages 670 & 677, TS 1925 W45C.3

Morton, Maurice, Introduction to Rubber Technology, Reinhold Pub. Corp., New York, 1959, pages 169–171

*Primary Examiner*—Allan Lieberman
*Assistant Examiner*—J. H. Derrington
*Attorney*—Hall & Houghton

[57] ABSTRACT

Curbing of silica pigment losses and the promotion of uniformity of product in the preparation of an elastomer-silica pigment masterbatch are effected (a) by combining (1) an aqueously wet hydrated silica pigment precipitate which has a bound alkali content, which has been prepared by precipitation from an aqueous alkali metal silicate solution, and which has been continuously maintained in an aqueously wet state without drying therefrom after its precipitation, with (2) a quantity of oleophilic amine material, (3) combining the resulting treated silica pigment with an aqueous dispersion of the elastomer containing an anionic dispersing agent, with or without (4) carbon black and/or processing oil, and (5) with selected reactant-coagulant, and (b) recovering the resulting coagulum as a masterbatch, the steps prior to (b) having rendered the serum of the aqueous mixture essentially free of silica pigment. Prior to combination with the elastomer dispersion the amine treated alkaline silica pigment may be recovered as a useful dispersible alkaline silica pigment product, or the wet pigment may be treated with water soluble salt of aluminum, or zinc or the alkali earth metals and/or with water soluble mineral acid or organic acids, as well as with the said amine, and after such treatment the resulting pigment composition may be recovered as a useful dispersible silica pigment product, or the so treated wet silica pigment may be combined as in (3), (4) and (5) above, and be recovered as in (b) above in the form of a masterbatch.

12 Claims, 1 Drawing Figure

United States Patent
Burke, Jr.
[15] 3,700,690
[45] Oct. 24, 1972
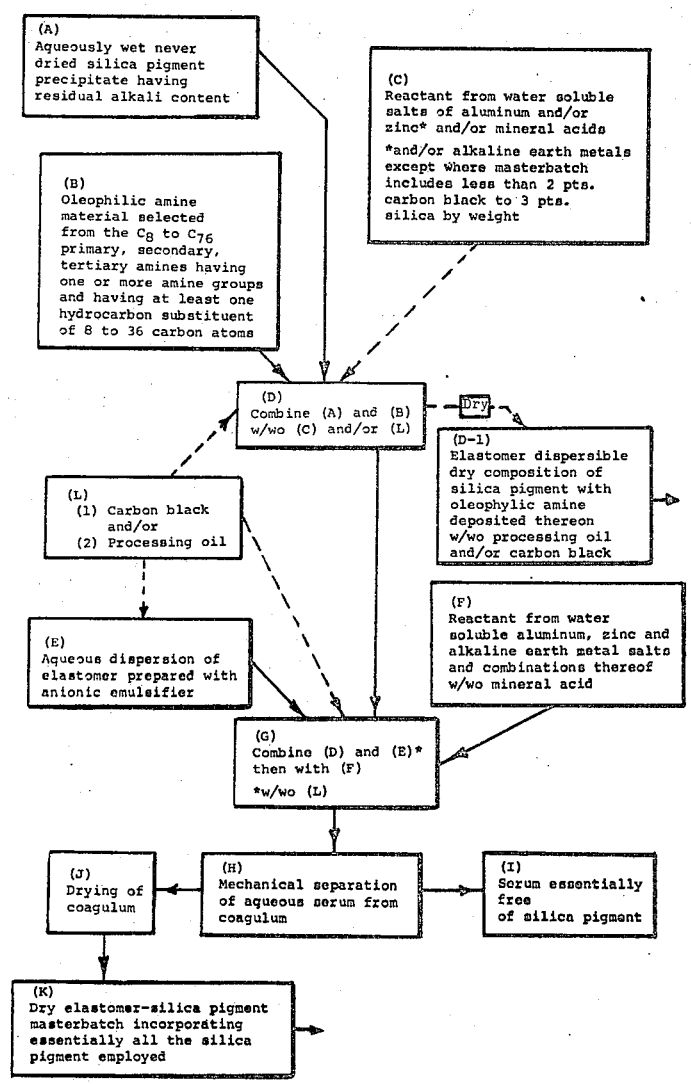

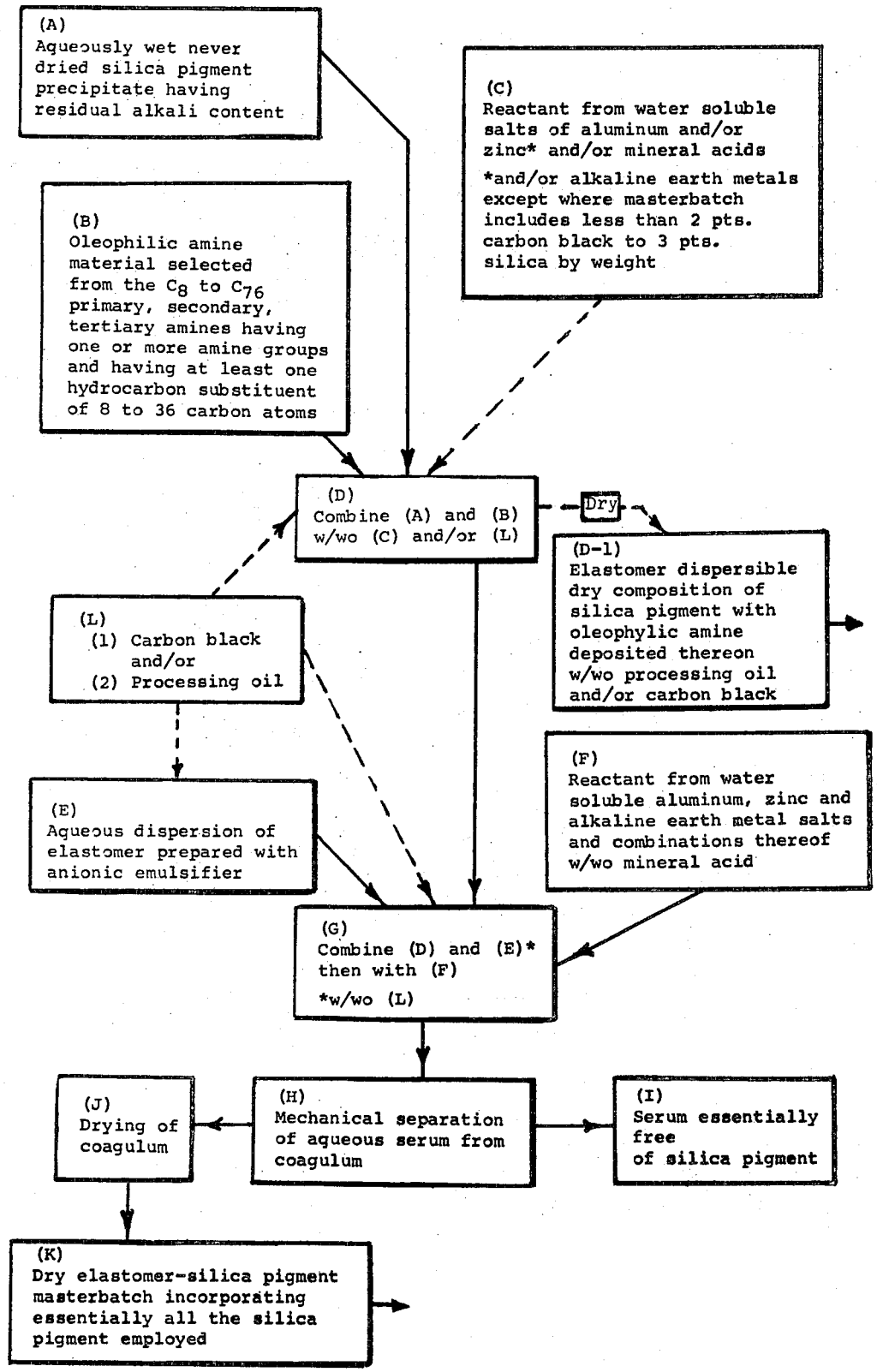

SILICA PIGMENTS AND ELASTOMER-SILICA PIGMENT MASTERBATCHES AND PRODUCTION PROCESSES RELATING THERETO

CROSS REFERENCE TO RELATED APPLICATIONS

This application is a continuation-in-part of copending applications Ser. No. 55,384 filed July 16, 1970 (Case 48DM–13) and Ser. No. 55,476 filed July 16, 1970 (now abandoned), which latter application is a continuation-in-part of application Ser. No. 798,215, now abandoned filed Sept. 16, 1968 as a division of application Ser. No. 611,250, filed Jan. 24, 1967 (now U.S. Pat. No. 3,523,096) said application Ser. No. 611,250 having been a continuation-in-part of earlier applications Ser. No. 458,420, filed May 24, 1965 (now abandoned); Ser. No. 458,379, filed May 24, 1965 (now abandoned); and Ser. No. 479,806, filed Aug. 16, 1965 (now U.S. Pat. No. 3,401,017), disclosures of all of which are incorporated herein by reference. Furthermore, this application is directed to a species of invention that was nonelected in applicant's copending application Ser. No. 55,384, and, pursuant to a restriction requirement, was withdrawn from consideration in that case.

BACKGROUND OF THE INVENTION

1. Field of the Invention

The field to which this invention pertains is the preparation of dispersible silica pigments and of masterbatches from latices (i. e. aqueous dispersions) of elastomers and aqueous slurries of precipitated silica pigments.

2. Description Of The Prior Art

It is well known in the art that attempts to make masterbatches from elastomer latex and aqueously dispersed hydrated silica pigment by latex masterbatching have resulted in loss of large amounts of the hydrated silica pigment in the mother liquor and in non-uniform masterbatches, and that even the addition of tetraethylene-pentamine (Whitby, Synthetic Rubber, John Wiley & Sons, Inc., New York, 1954, page 676) or glue, gelatin or casein (U.S. Pat. No. 2,616,860) has not provided a satisfactory solution to this problem. Also, to applicant's knowledge there is not at the present time any elastomer-silica masterbatch being offered on the commercial market, nor are the dispersible dry silica pigment compositions provided by this invention known.

BRIEF DESCRIPTION OF THE DRAWING

The single FIGURE of the drawing is a block-diagram illustrative of the process aspect of the invention.

SUMMARY OF THE INVENTION

It is known to those skilled in the art to prepared hydrated silica pigment for the reinforcement of rubber by precipitation from aqueous solutions of alkali metal silicates with the aid of carbon dioxide, and to carry out such precipitation in manners to avoid the formation of gelatinous masses—(i.e. the formation of silica gel)— and to promote the precipitation of a silica pigment in finely divided form (i.e. in particles in the reinforcing size range of about 0.015 to about 0.150 microns, preferably 0.02 to 0.06 microns) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10 percent by weight as $Na_2O$, and upon being dried in this state form aggregates, from the pigment particles of reinforcing size, which aggregates are of much greater than reinforcing size and will not adequately disperse (i. e. break down into particles of reinforcing size) when incorporated into rubber either by dry compounding or latex masterbatching.

When one treats such alkaline wet silica pigments with water soluble salts of alkaline earth metals, e. g. calcium salts, to substantially replace the bound alkali metal of the silica, the resulting pigment, when dried, can still evidence the formation of aggregates of greater than reinforcing size, which may not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment acidic, by treatment with sulfuric acid or with a water soluble organic acid and drys it, the resulting acidic product is more readily dispersible in rubber, and exhibits minimum aggregation. Highly acidic pigments are not practicable for use in the reinforcement of rubbers, since their acidity adversely affects vulcanization of the rubber.

Thus the drying of the wet silica pigment in alkaline, neutral, and moderately acidic states, in each instance causes the formation of aggregates of pigment particles to a greater or lesser degree which aggregation can prevent adequate dispersion of the dry pigment in the rubber; the formation of these aggregates by the drying of the pigment is irreversible; and they remain mostly as aggregates that do not disperse in the rubber.

This invention is based on the premise that uniformity of an elastomer-pigment masterbatch depends both on obtaining incorporation of a measured quantity of pigment in the masterbatch (e. g. avoiding loss of pigment in the serum in wet masterbatching) and adequate dispersion of the pigment in the elastomer in particles of reinforcing size (e. g. minimizing the pigment aggregation problem); and the present invention provides a process for accomplishing these ends by forming the masterbatch from aqueously wet hydrated silica pigment precipitates having a bound alkali content of 0.1 to 10 percent by weight as $Na_2O$; which has been prepared by precipitation from an aqueous solution of alkali metal silicate with the aid of carbon dioxide; and which has continuously been maintained in an aqueously wet state after its precipitation without having been dried therefrom; and while still in the aqeuously wet state said silica is combined with elastomer dispersion, with special provisions for avoiding loss of pigment in the aqueous phase and promoting uniformity of product in the masterbatch.

Thus, the present invention, inter alia, provides a simple and efficient process for the curbing of silica pigment losses and the promotion of uniformity of product in the preparation of masterbatches of measured silica pigment content. As shown in the drawing, the first part of the process comprises the steps of:

A. providing 5 to 100 parts by weight, dry basis, of aqueously wet hydrated silica pigment precipitate which has a bound alkali content in the range of 0.1 to 10 percent by weight as $Na_2O$; which has been prepared by precipitation from an aqueous solution of alkali metal silicate with the aid of carbon dioxide; and which has continuously been maintained in an aqueously wet state without having been dried therefrom after its precipitation;

B. providing a quantity of from 0.1 to 20 percent by weight, based on the silica pigment, dry basis, referred to in step (A), of oleophilic amine material, e. g. from the category consisting of the primary, secondary, and tertiary amines having at least one hydrocarbon or halohydrocarbon substituent containing 8 to 36 carbon atoms;

C. providing reactant material selected from the group consisting of water soluble acids (mineral or organic) and water soluble salts of aluminum, zinc, or alkaline earth metals, and combinations of the foregoing; and D. combining the wet silica pigment—from (A)—with the oleophilic material—from (B)—, and, optionally, with material—from (C)—selected from the group consisting of water soluble acids and water soluble salts of aluminum, zinc, or alkaline earth metals;

thereby to form an aqueously wet, rubber dispersible, silica pigment composition. The silica pigment composition so provided may be dried to yield useful dispersible dry silica pigment compositions as indicated at (D–1), or may be used without drying, e. g. in the second part of the masterbatching process, by E. providing an aqueous dispersion containing
1. 100 parts by weight of the elastomer and
2. from 0.5 to 15 parts by weight of anionic dispersing agent;

G. forming a mixture of (1) the aqueous elastomer dispersion—from (E)—, (2) the treated wet silica pigment—from (D)—, (3) from 0–75 parts by weight of carbon black with the limitation that the total of silica pigment and carbon black, dry basis, not exceed 80 parts by weight, (4) from 0–45 parts by weight of processing oil, and (5) a sufficient quantity of the reactant material provided in step (C) to cause coagulation of the solids of the combination, whereby there is formed a coagulum of such solids rendering the aqueous serum of the combination essentially free of silica pigment; and H. to K. recovering the coagulum as a masterbatch.

In the optional step of combining the acid or metal salt reactant with the silica pigment, thus lowering the alkalinity of the silica pigment, such step can be performed either simultaneously with, preceding to, or after the combining of the silica pigment with the oleophilic amine. The amount of acid or metal salt reactant used to treat the silica pigment should be no greater than that which permits the serum from the resulting masterbatch to be essentially free of silica, i. e. contains less than 2 percent by weight (dry basis) of the silica pigment employed. Preferably the amount of acid or metal salt reactant is at least sufficient, though, to react at lease stoichiometrically with the alkalinity of the silica pigment. If too great an excess of acid is combined with the pigment initially, the pigment can still be used in the process of the present invention provided it is treated with sufficient alkaline material, e.g., ammonium hydroxide, to reduce the undesirable excess acid material.

When the coagulating agent employed is a mineral acid, e. g. sulfuric acid, it is preferable that it not be used in great excess over that required to effect coagulation, for if it is it will tend to cause silica fines to remain in the serum and not be incorporated in the coagulum.

When chloroprene latex is employed with the treated or untreated silica pigment to form the masterbatch it is preferable to use an organic acid coagulating agent so as to form a suitable sized masterbatch crumb.

In preferred embodiments, respectively: (1) step (G) is practiced by pre-mixing the aqueous elastomer dispersion—from (E)—with the treated wet silica pigment-from (D)—and then combining such mixture with the reactant material referred to in step (G)—from (F)—; (2) in step (B) at least 0.1 percent, most preferably at least 0.5 percent, based on the silica pigment referred to in step (D), dry basis, by weight of the oleophilic material is provided; (3) at least 5 parts by weight of carbon black is included in the mixture at (D) and/or (G); and (4) at least 5 parts by weight of processing oil is included in the mixture at (D) and/or (G).

Under the foregoing conditions the steps prior to the recovery render the serum resulting from the coagulation essentially free of silica pigment, thus assuring a uniform silica pigment content in the masterbatch. The achievement of this desideratum is evidenced by the fact that when the coagulum is mechanically removed from the serum as indicated at (H), the serum (I) is found to be essentially free of silica pigment.

The principal processes, and especially the preferred embodiments thereof, produce pigment and masterbatch products useful for the rubber industry.

In the making of the dispersible pigment compositions, the carbon black—from (L)—is employed in the range of 0 to 1,500 parts per 100 parts of the silica pigment, dry basis by weight, and the processing oil—from (L)—in the range of 0 to 45 parts by weight per 80 parts of dry solids of the mixture.

In the following description of preferred embodiments, Examples 1–20, 23–31, and 34–38 embody the over-all process of preparing the silica composition and masterbatch, in which the conditions are such that any aluminum, zinc or alkaline earth metal salt that is employed is confined to the coagulant (F) of the drawing; Examples 1–11, 13, 21–24, 28–34, 37, and 38 are of embodiments in which reactant (C) of the drawing is also used; Examples 16–20 are of the preparation of dried, dispersible silica pigment compositions without using reactant (C); and Examples 21–24 are of the preparation of dispersible, dry silica pigment compositions with reactant (C) included therein, while in Examples 28–36 the masterbatches also contain carbon black and/or processing oil. Examples 37 and 38 embody preparation of an acidic silica and coagulation of the elastomersilica masterbatch with the aid of a water soluble organic acid.

DESCRIPTION OF THE PREFERRED EMBODIMENTS

Preferred embodiments of the present invention avoid the use of organic additives such as tetraethylene pentamine, glue, gelatin, casein, etc., which increase the cost and may affect the curing properties of the masterbatch. The invention, inter alia, may be used to improve wet silica masterbatching and masterbatches using any never dried aqueously wet silica pigment containing bound alkali, and is applicable to the formation of masterbatches therewith with elastomer latices prepared with anionic emulsifier of the type coagulable with metal salts of the coagulant. The present invention does not rely for patentability on the use of latices of elastomers which are interpolymers (i. e. graft polymers, copolymers, or block polymers) of polar vinylidene monomer of the class consisting of the primary amine, secondary amine, tertiary amine, and quaternary ammonium monomers, or which contain hydroxyl groups which uses are claimed in separate applications filed concurrently herewith. It may employ latices of diene homopolymer rubbers such as polybutadiene, polyisoprene, polychloroprene; those of diene copolymer rubbers such as the copolymers of diene monomers and monomers containing and copolymerizable therewith through a single ethylenically unsaturated group, e. g. butadiene-styrene, butadiene-acrylonitrile or methacrylonitrile, butadiene-acrylate or methacrylate ester; and rubber copolymers of hydrocarbon monomers with polar vinylidene (including vinyl) monomers except those excluded above, as well as mixtures and combinations thereof with processing oils, herein referred to as oil-rubber-silica masterbatches, and any of the foregoing further including other cooperating ingredients, such as carbon black, providing the silica pigment comprises an essential component thereof, e. g. carbon black-elastomer-silica masterbatch.

Silica pigments containing residual alkali suitable for masterbatching in accordance with the present invention are usually precipitated by the gradual acidulation of aqueous sodium silicate solution with the aid of carbon dioxide.

The oleophilic amine materials suitable for practicing the invention include especially those amine compounds having one or more amine groups, a total of from eight to 108 carbon atoms, and at least one hydrocarbon or halohydrocarbon (e. g. chlorine or fluorine containing) substituent that contains at least eight carbon atoms. Each hydrocarbon or halohydrocarbon substituent preferably has from eight to 36 carbon atoms, and may be aliphatic, cycloaliphatic or aryl. Most preferably at least one hydrocarbon or halohydrocarbon substituent is aliphatic (straight or branched chain, saturated or ethylenically unsaturated), e. g. alkyl. In addition to hydrocarbon and/or halohydrocarbon substituents, the amine may have one or more other groups containing oxygen, nitrogen, sulfur or phosphorous atoms. The following categories are illustrative of preferred oleophilic amines for use in the present process:

1. long-chain primary monomers represented by the formula R—NH$_2$ in which R is an aliphatic hydrocarbon group of at least eight carbon atoms, e.g., is alkyl of eight to 36 carbon atoms such as octyl amine, decyl amine, dodecyl amine, tetradecyl amine, hexadecyl amine, octadecyl amine, palmitoleyl amine, oleyl amine, linoleyl amine, linolenyl amine, the mixed primary amines derived from fatty oils such as coco amine, soybean amine, tallow amine, rosin amine, and partially or completely hydrogenated amines derived from the above unsaturated amines, and the like;

2. long-chain secondary monoamines having at least one aliphatic hydrocarbon, e. g. alkyl, substituent containing at least eight carbon atoms, e. g. long-chain secondary amines represented by the formula

in which R contains from eight to 36 carbon atoms and R' contains from one to 36 carbon atoms, and includes but is not limited to dioctyl amine, didecyl amine, didodecyl amine, ditetradecyl amine, dihexadecyl amine, dioctadecyl amine, dipalmitoleyl amine, dioleyl amine, dilinoleyl amine, dilinolenyl amine, the mixed secondary amines derived from fatty oils such as dicoco amine, disoybean amine, ditallow amine, hydrogentated ditallow amine, N-methyloctylamine, N-methyldodecylamine, N-methylhexadecylamine, N-ethyloctylamine, N-ethyloctadecylamine, N-propyldodecylamine, N-butyloctylamine, and the like;

3. long-chain tertiary monoamines having at least one aliphatic hydrocarbon, e. g. alkyl, substituent containing at least eight carbon atoms, e. g. (a) long chain, acyclic tertiary amines represented by the formula

in which R contains eight to 36 carbon atoms, R' contains one to 36 carbon atoms and R'' contains one to 36 carbon atoms, including but not limited to trioctyl amine, tridodecyl amine, tristearyl amine, octyldimethyl amine, dioctyl methyl amine, dodecyl dimethyl amine, didodecyl methyl amine, octadecyl dimethyl amine, dioctadecyl methyl amine, the mixed tertiary amines derived from fatty oils, coco dimethyl amine, dicoco methyl amine, soybean dimethyl amine, disoybean methyl amine, tallow dimethyl amine, ditallow methyl amine, and the hydrogenated or partially hydrogenated products of unsaturated tertiary amines, and the like; and b. long chain cyclic tertiary amines including but not limited to N-coco morpholine, N-soya morpholine, N-tallow morpholine and the like;

4. long-chain diamines and polyamines having at least one aliphatic hydrocarbon, e.g., alkyl, substituent containing at least eight carbon atoms, e. g. from eight to 36 carbon atoms, including, but not limited to, the diamines represented by the formula RNH(CH$_2$)$_x$NH$_2$ in which R is an aliphatic hydrocarbon group of eight to 36 carbon atoms and $x$ is an integer from 1 to 18, as for example N-coco-trimethylene diamine, N-soya trimethylene diamine, N-tallow trimethylene diamine, N-oleyl trimethylene diamine, N-octyl dimethylene diamine, N-octyl tetramethylene diamine, the above diamines with one or more amine hydrogens replaced by a methyl, ethyl, propyl or butyl group, and the like;

5. long-chain, polyalkoxylated, secondary and tertiary monoamines containing at least one aliphatic hydrocarbon, e.g., alkyl, substituent having at least eight carbon atoms, e.g., from eight to 36 carbon atoms, including but not limited to, the polyethoxylated and polypropoxylated amines represented by the formulas

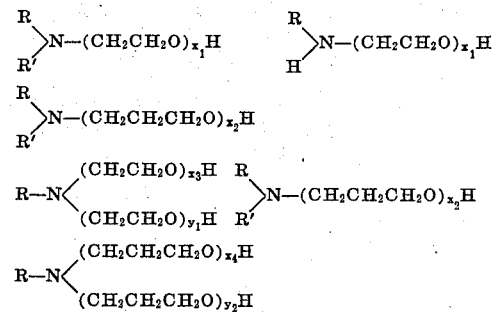

in which R is an aliphatic hydrocarbon group of eight to 36 carbon atoms, R' is an aliphatic hydrocarbon group of one to 36 carbon atoms, and $x_1$, $x_2$, $x_3$, $x_4$, $y_1$, and $y_2$ are each integers between 1 and 30, and including but not limited to coco amine, soybean amine, tallow amine and stearyl amine each reacted with a plurality, e. g. 2, 5, 10 or 15, moles of ethylene oxide or propylene oxide per mole of amine, and the like;

6. long-chain, polyalkoxylated diamines having at least one aliphatic hydrocarbon, e.g., alkyl, substituent of at least eight carbon atoms, e.g., from eight to 36 carbon atoms, including, but not limited to, the diamines represented by the formulas

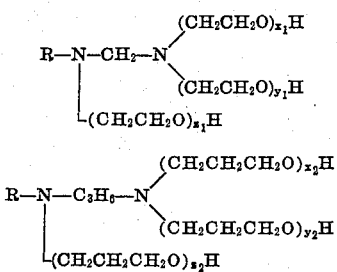

in which R is an aliphatic hydrocarbon group of eight to 36 carbon atoms and $x_1$, $x_2$, $y_1$, $y_2$, $z_1$ and $z_2$ are each integers between 1 and 30, which include, but are not limited to, the reaction products of N-coco trimethylene diamine, N-soya trimethylene diamine and N-tallow trimethylene diamine each with a plurality of, e. g. 3, 10 or 20 moles of ethylene oxide or propylene oxide per mole of amine, and mixtures of such oxides and the like.

The oleophilic amine if desired can be applied to the wet silica pigment while the amine is in solution in a suitable organic solvent, e.g., isopropanol, hexane, benzene or toluene. This facilities even distribution of the amine throughout the pigment.

It is understood that the process of the present invention does not encompass the preparation of the amine-treated silica pigment by adding to the pigment either an oleophilic quarternary ammonium compound or an oleophilic amine salt of a carboxylic acid, elsewhere claimed.

Carbon Black

By the term "carbon black" as used herein is meant any carbon black suitable for use by the rubber industry and set forth under the title "carbon blacks" at pages 251 to 264 of the publication entitled "Materials and Compounding Ingredients for Rubber," compiled by J. V. Del Gatto, published by Rubber World, 1968, and herein incorporated by reference, e.g., Philblack O (TM), Statex K (TM), Statex 160 (TM), Kosmobile 77 (TM), Thermax (TM), and the like.

Processing Oils

The term "processing oils" as used herein means rubber processing material of both liquid and solid types (if required the solids types can be converted to the liquid state for use herein with the aid of solvent or plasticizer) and includes the processing materials set forth under "Plasticers and Softeners" at pages 149 to 214 of the publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches e.g., Bardol (TM), Bardol B (TM); (b) the asphalts, e. g. BRH No. 2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex–20, –419, –726, –757, –787 (TM), and Califlux TT (TM) and other oils suitable for rubber compounding or the oil extension of synthetic rubber; (d) the coumarone-indene oils and resins, e. g. Cumar Resin RH, –PlO, –T (TM); (e) the liquid ester type plasticizers, e. g. dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e. g. Durez 12687, 12707 (TM) and the like; (g) the hydrocarbon resins, e. g. Neville-LX 782, –LX 125, (TM), Para-Flux, Para Resin 2457 (TM); (h) the coumarone-indene resin polymers, e. g. Picco Resins (TM); (i) the pine tars and pine tar oils, rosin and rosin oils, and tall oil and its derivatives, e.g., PT–101, PT–401, PT–800 (TM); and the like.

The term "water soluble acids" means "water soluble mineral acids" and "water soluble organic acids." The water soluble mineral acids include sulfuric acid, hydrochloric acid, and the like. The water soluble organic acids include, but are not limited to, the water soluble, aliphatic monocarboxylic acids, e.g., the alkanoic acids of one to three carbon atoms (formic, acetic, and propanoic) and the water soluble, hydroxylalkanoic acids such as hydroxyacetic acid, 2-hydroxypropanoic acid, 3-hydroxypropanoic acid, the hydroxybutanoic acids, 2,3-dihydroxypropanoic acid, and the like.

EXAMPLES

The following examples will serve to illustrate the invention in more detail:

Silica Preparation

The aqueously wet never dried alkaline silica pigment employed in all the examples was prepared in a manner similar to Example 9 of U.S. Pat. No. 3,250,594 except that the ratio of 41° Be commercial sodium silicate ($Na_2O/(SiO_2)_{3.22}$) to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2 percent and the filter cake had a solids of approximately 10 percent by weight. The resulting aqueously wet silica pigment was designated wet alkaline silica pigment-I, and had a bound and residual alkali content of about 1.5 percent by weight as $Na_2O$, and a serum pH of about 8.5 (8.5 to 9.5 or even higher).

A portion of this alkaline silica filter cake was slurried with about a half volume of water and was acidified to a pH of 4.5 with dilute sulfuric acid and as a filter cake, with washing to a filtrate pH of about 6.4 to 7.0, had a solids of approximately 10 percent by weight. The resulting aqueously wet silica slurry was designated wet silica pigment-II.

The just described filter cakes having a solids content of about 10 percent by weight are embraced within the term "wet silica pigment" (which herein connotes aqueously wet silica pigment) as are wet pigments of more reduced water content, which can be prepared by pressing the said filter cakes, or of augmented water content, e. g. slurries having less than 10 percent solids content, and the terms "aqueously wet silica pigment" or "aqueously wet state," as employed herein are generic to all such conditions. Thus these terms as employed herein embrace aqueously wet silica pigment materials having a solids content in the range of about 1 percent to about 65 percent solids, dry basis, by weight; however, for economy in the practice of the invention wet silica pigments of reduced water content (solids content 8 percent or higher) are preferred.

To determine pigment quality a portion of wet silica pigment-II was dried at 105° C., micro-pulverized and compounded as set forth in Table I hereof.

TABLE I

| Compound Ingredients: | Quantities (pts. wt.) |
| --- | --- |
| Butadiene-styrene copolymer[1] | 100 |
| Silica pigment-II dried | 60 |
| Antioxidant, 2,2-methylene-bis (4-methyl-6-t.-butylphenol) | 2.0 |
| Magnesium oxide | 4.0 |
| Paracoumarone-indene resin[2] | 10.0 |
| Zinc oxide | 1.0 |
| N-tert-butyl-2-benzothiazole-sulphenamide | 0.75 |
| N,N'-di-o-tolylguanidine | 1.5 |
| Triethanolamine | 1.0 |
| Phthalic anhydride | 0.75 |
| Sulfur | 2.25 |

[1] SBR 1502
[2] Cumar Resin RH, a trademark poduct of Allied Chemical Corp.

The compound was aged over-night, re-milled and cured for 45 minutes at 287° F.

The physical test data for the vulcanizate so prepared with the foregoing silica pigment is set forth in Table II hereof.

TABLE II

| Silica tested (in vulcanizate) | Hardness (Shore A) | Tensile (psi) | Modulus (300%) | Elong. (%) |
| --- | --- | --- | --- | --- |
| Silica Pigment-II | 72 | 3530 | 1140 | 575 |

In addition to the procedures set forth in the Tables it has also been found that streams of the elastomer latex and of the amine treated silica pigment slurry may be continuously mixed and that the resulting stream may be continuously mixed with a stream of the coagulant, and that this procedure also will yield a coagulum containing essentially all of the silica pigment, leaving essentially no silica pigment in the aqueous phase. Thus the processes of the examples are adaptable for either continuous or batch production of the masterbatch. In those instances in which an oil-rubber-silica pigment masterbatch is desired, up to about 30 percent of oil based on the elastomer is added to the latex prepared with anionic emulsifier according to the foregoing examples, preferably with a small amount of ammonium hydroxide to aid dispersion of the oil into the elastomer, and it will thus be understood that the masterbatch and elastomer dispersion contemplated by the invention may contain a minor proportion of oil. Similarly in Examples 1 to 11, any soluble aluminum salt may be substituted for the hydrated aluminum sulfate, e.g., aluminum ammonium sulfate or aluminum sodium sulfate, and the coagulant solution contemplated by the invention may thus comprise minor amounts of ammonium and/or alkali metal salts without detriment to the process. Furthermore the elastomer latex and/or the treated dispersion of silica pigment and/or the aqueous coagulant solution may contain a small proportion of ammonium hydroxide which appears in certain instances to facilitate the practice of the invention. When the coagulant solution contains mineral acid a quantity of aqueous sodium chloride may advantageously be employed therewith to avoid the necessity of having to use excessive quantities of the acid to effect coagulation, as an excessive quantity of such acid may cause silica pigment to appear in the serum. When carbon black is also to be included in the elastomer-silica pigment masterbatch, it may, if desired, be incorporated as an aqueous slurry along with the slurry of the silica pigment.

In the following tabulations of Examples 1–38 the ingredients (A), (B), (C) etc., are listed in the order of their addition, except where otherwise specifically set forth. These examples were carried out at ambient temperatures, however, more elevated temperatures may be employed, e. g. to accelerate the processing.

TABLE III

Polymer-silica Masterbatch

| Example | (Parts by wt.) | | | |
| --- | --- | --- | --- | --- |
| | 1 | 2 | 3 | 4 |
| (A) Silica Pigment Slurry Alkaline silica pigment-I (pH 8.5–9.5) | 150 | 150 | 150 | 150 |

| | | | | |
|---|---|---|---|---|
| Dry solids basis | 15 | 15 | 15 | 15 |
| Water | 50 | 50 | 50 | 50 |
| (B) Reagent-Aqueous Solution | | | | |
| 10% sulfuric acid | 5.1 | 5.1 | 5.1 | 5.1 |
| Silica slurry, pH* 6.4–7.0 (X) | X | X | X | X |
| Water | 10 | 10 | 10 | 10 |
| *filter cake after washing | | | | |
| (C) Oleophilic Amine Material in Isopropanol | | | | |
| 10% Armeen T[1] | 3.0 | — | — | — |
| 10 percent Ethoduomeen T/25[2] | — | 1.5 | — | — |
| 10% Duomeen T[3] | — | — | 3.0 | 3.0 |
| (D) Polymer Latex | | | | |
| Butadiene-styrene[4] | 153 | 153 | 153 | 150 |
| Dry solids basis | 30 | 30 | 30 | 30 |
| Antioxidant[5] | 0.6 | 0.6 | 0.6 | 0.6 |
| (E) Coagulant-Aqueous Solution | | | | |
| 2% aluminum sulfate[6] | 90 | 80 | 90 | 54 |
| 2% sulfuric acid | — | — | — | 12 |
| Water | 450 | — | — | — |
| (F) Coagulation | | | | |
| Added treated silica + polymer latex to coagulant (X) | X | X | X | X |
| pH serum | 4.0 | 4.0 | 4.0 | 4.0 |
| Silica in serum | none | none | none | none |
| (G) Masterbatch | | | | |
| Filtered and washed (X) | X | X | X | X |
| Dried (105°C.) (X) | X | X | X | X |

[1] Armeen-T - tallow-amine, a trademark product.
[2] Ethoduomeen T/25 - Polyoxyethylene tallow trimethylene diamine, a trademark product.
[3] Duomeen T - N-tallow trimethylene diamine, a trademark product.
[4] SBR 1502 (T. S. = 19.7%)**.
[5] Antioxidant is 2,2'-methylene-bis(4-methyl-6-t.-butylphenol) and may be added as a solvent solution e.g. dissolved in isopropanol or as an aqueous emulsion.
[6] Aluminum sulfate = $Al_2(SO_4)_3 \cdot 14H_2O$.
** Of the solids, about 5% by weight is anionic emulsifier.

TABLE IV

Polymer-silica Masterbatch (Parts by wt.)

| Example | 5 | 6 | 7 | 8 |
|---|---|---|---|---|
| (A) Silica Pigment Slurry | | | | |
| Alkaline silica pigment-I (pH 8.5–9.5) | 150 | 150 | 150 | 150 |
| Dry solids basis | 15 | 15 | 15 | 15 |
| Water | 50 | 50 | 50 | 50 |
| (B) Reagent-Aqueous Solution | | | | |
| 10% sulfuric acid | 5.1 | 5.1 | 5.1 | 5.1 |
| Silica slurry pH* 6.4–7.0 (X) | X | X | X | X |
| Water | 10 | 10 | 10 | 10 |
| *filter cake after washing | | | | |
| (C) Oleophilic Amine Material in Isopropanol | | | | |
| 10% Armeen DMCD[1] | 1.5 | — | — | — |
| 10% Armeen 2C[2] | — | 3.0 | — | — |
| 10% Ethomeen T/12[3] | — | — | 1.5 | — |
| 10% Dehydroabietylamine | — | — | — | 1.5 |
| (D) Polymer Latex | | | | |
| Butadiene-styrene[4] | 153 | 153 | 153 | 153 |
| Dry solids basis | 30 | 30 | 30 | 30 |
| Antioxidant[5] | 0.6 | 0.6 | 0.6 | 0.6 |
| (E) Coagulant-Aqueous Solution | | | | |
| 2% aluminum sulfate[6] | 70 | 60 | 70 | 60 |
| Water | 250 | 250 | 250 | 250 |
| (F) Coagulation | | | | |
| Added coagulant to treated Silica + polymer latex (X) | X | X | X | X |
| pH serum | 4.0 | 4.0 | 4.0 | 4.0 |
| Silica in serum | none | none | none | none |
| (G) Masterbatch | | | | |
| Filtered and washed (X) | X | X | X | X |
| Dried (105°C.) (X) | X | X | X | X |

[1] Armeen DMCD - Coco dimethyl amine, a trademark product.
[2] Armeen 2C - dicoco amine, a trademark product.
[3] Ethomeen T/12-di(polyoxyethylene) tallow amine, a trademark product.
[4] SBR 1502 (T. S. = 19.7%).
[5] Antioxidant is 2,2'-methylene-bis(4-methyl-6-t.-butylphenol).
[6] Aluminum sulfate = $Al_2(SO_4)_3 \cdot 14H_2O$.

TABLE V

Polymer-Silica Masterbatch (Parts by wt.)

| Example | 9 | 10 | 11 |
|---|---|---|---|
| (A) Silica Pigment Slurry | | | |
| Alkaline Silica pigment-I (pH 8.5–9.5) | 150 | 150 | 150 |
| Dry solids basis | 15 | 15 | 15 |
| Water | 50 | 50 | 50 |
| (B) Reagent-Aqueous Solution | | | |
| 2% sulfuric acid | 25.5 | 25.5 | 25.5 |
| Silica slurry pH* | 7 | 7 | 7 |
| Water | 60 | 90 | 90 |
| *filter cake after washing | | | |
| (C) Oleophilic Amine Material in Isopropanol | | | |
| 10% Duomeen T[1] | 1.5 | 3.0 | 3.0 |
| (D) Polymer Latex | | | |
| Butadiene-acrylonitrile[2] | 63 | — | — |
| Butadiene-acrylonitrile[3] | — | 61 | — |
| Chloroprene[4] | — | — | 43 |
| Dry solids basis | 25 | 25 | 25 |
| Antioxidant[5] | 0.5 | 0.5 | 0.5 |
| Water | 60 | 60 | 150 |
| (E) Coagulant-Aqueous Solution | | | |
| 2% aluminum sulfate[6] | 125 | 90 | 70 |
| Water | 250 | — | — |
| Isopropanol | — | 150 | 75 |
| (F) Coagulation | | | |
| Treated silica + polymer latex were added to coagulant (X) | X | X | X |
| pH serum | 4.0 | 4.0 | 4.0 |
| Silica in serum | none | none | none |
| (G) Masterbatch | | | |
| Filtered and washed (X) | X | X | X |
| Dried (105°C.) (X) | X | X | X |

[1] Duomeen T, N-tallow trimethylene diamine, a trademark product.
[2] Hycar 1570 X 20, a carboxyl-modified butadiene/acrylonitrile latex, a trademark product.
[3] Hycar 1561, a butadiene/acrylonitrile latex, a trademark product.
[4] Chloroprene - Neoprene 635 latex, a trademark product.
[5] Antioxidant is 2,2'-methylene-bis (4-methyl-6-t.-butylphenol).
[6] Aluminum sulfate = $Al_2(SO_4)_3 \cdot 14H_2O$.

TABLE VI

Polymer-Silica Masterbatch (Parts by wt.)

| Example | 12 | 13 | 14 | 15 |
|---|---|---|---|---|
| (A) Silica Pigment Slurry | | | | |
| Alkaline silica pigment-I (pH 8.5–9.5) | 150 | 150 | 150 | 150 |
| Dry solids basis | 15 | 15 | 15 | 15 |
| Water | 60 | 50 | 50 | 50 |
| (B) Reagent-Aqueous Solution | | | | |
| 2% sulfuric acid | — | 25.5 | — | — |
| 2% aluminum sulfate[1] | — | — | 50 | — |
| 2% zinc sulfate | — | — | — | 42 |
| Silica slurry pH* | — | 7.0 | 4.0 | 7.0 |
| Water | — | 60 | 60 | 60 |
| *filter cake after washing | | | | |
| (C) Oleophilic Amine Material in Isopropanol | | | | |
| 10% Duomeen T[2] | 3.0 | 3.0 | 3.0 | 3.0 |
| (D) Polymer Latex | | | | |
| Butadiene-styrene[3] | 153 | 153 | 153 | 153 |
| Dry solids basis | 30 | 30 | 30 | 30 |
| Antioxidant[4] | 0.6 | 0.6 | 0.6 | 0.6 |
| (E) Coagulant-Aqueous Solution | | | | |
| 2% zinc sulfate | 180 | — | — | — |
| 2% calcium chloride | — | 90 | — | — |
| 2% magnesium sulfate | — | — | 160 | — |
| 1% barium chloride | — | — | — | 130 |
| Water | — | — | 160 | 130 |
| (F) Coagulation | | | | |

| | | | | |
|---|---|---|---|---|
| Added treated silica + polymer latex to coagulant (X) | X | X X | X | |
| pH serum | 6.4 | 6.8 6.4 | 6.0 | |
| Silica in serum | none | none none | none | |
| (G) Masterbatch | | | | |
| Filtered and washed (X) | X | X X | X | |
| Dried (105°C.) (X) | X | X X | X | |

[1]Aluminum sulfate Al$_2$(SO$_4$)$_3$·14H$_2$O.
[2]Duomeen T, N-tallow trimethylene diamine, a trademark product.
[3]SBR 1502 (T. S. = 19.7%).
[4]Antioxidant is 2,2'-methylene-bis(4-methyl-6-t.-butylphenol).

TABLE VII

Dispersible Silica (Parts by wt.)

| Example | 16 | 17 | 18 | 19 | 20 |
|---|---|---|---|---|---|
| (A) Silica Slurry | | | | | |
| Alkaline silica pigment-I (pH 8.5–9.5) | 150 | 150 | 150 | 150 | 150 |
| Dry solids basis | 15 | 15 | 15 | 15 | 15 |
| Water | 50 | 50 | 50 | 50 | 50 |
| (B) Oleophilic Amine Material in Isopropanol | | | | | |
| 10% Armeen T[1] | 10 | — | — | — | — |
| 10% Ethoduomeen T/25[2] | — | 15 | — | — | — |
| 10% Duomeen T[3] | — | — | 30 | — | — |
| 10% Stearyl amine sulfate* | — | — | — | 15 | — |
| 10% Oleyl amine hydrochloride* | — | — | — | — | 15 |
| (C) Treated Silica | | | | | |
| Dried (105°C.) (X) | X | X | X | X | X |

[1]Armeen-T - tallow amine, a trademark product.
[2]Ethoduomeen T/25 - Polyoxyethylene tallow triethylenediamine, a trademark product.
[3]Duomeen T - N-alkyl trimethylene diamine, a trademark product.
⁶*Incorporated with the aid of Waring blender, a tradmark product.

TABLE VIII

Dispersible Silica (Parts by wt.)

| Example | 21 | 22 | 23 | 24 |
|---|---|---|---|---|
| (A) Silica Slurry | | | | |
| Alkaline silica pigment-I (pH 8.5–9.5) | 150 | 150 | 150 | 150 |
| Dry solids basis | 15 | 51 | 15 | 15 |
| Water | 50 | 50 | 50 | 50 |
| (B) Reagent Aqueous Solution | | | | |
| 2% aluminum sulfate[1] | 18 | — | — | — |
| 2% zinc sulfate | — | 20 | — | — |
| 2% sulfuric acid | — | — | 8.5 | — |
| 20% acetic acid[2] | — | — | — | 15 |
| Silica slurry, pH | 5.0 | 6.5 | 7.0 | 4.0 |
| (C) Oleophilic Amine Material in Isopropanol | | | | |
| 10% Armeen DMCD[3] | 10 | — | — | — |
| 10% Armeen 2C[4] | — | 15 | — | — |
| 10% Ethomeen T/12[5] | — | — | 30 | — |
| 10% Armeen T[6] | — | — | — | 15 |
| (D) Treated Silica | | | | |
| Dried (105°C.) (X) | X | X | X | X |

[1]Aluminum sulfate = Al$_2$(SO$_4$)$_3$·14H$_2$O.
[2]May be replaced by an equivalent quantity of hydroxyacetic acid or other water soluble organic acids.
[3]Armeen DMCD - Coco dimethyl amine, a trademark product.
[4]Armeen 2C - Dicoco amine, a trademark product.
[5]Ethomeen T/12 - Polyoxyehtylene tallow amine, a trademark product.
[6]Armeen T, tallow amine, a trademark product.

TABLE IX

Polymer-Silica Masterbatch (parts by wt.)

| Example | 25 | 26 | 27 |
|---|---|---|---|
| (A) Silica Pigment Slurry | | | |
| Alkaline silica pigment -I (pH 8.5–9.5) | 125 | 125 | 125 |
| Dry solids basis | 12.5 | 12.5 | 12.5 |
| Water | 50 | 50 | 50 |
| (B) Oleophilic Amine Material | | | |
| 10% Duomeen T[1] | 1.5 | 1.5 | 3.0 |
| (C) Combine (A) and (B) | | | |
| Blend (X) | X | X | X |
| (D) Polymer Latex-Aqueous | | | |
| 39.8% Butadiene-acrylonitrile[3] | 63 | — | — |
| 41% Butadiene-acrylonitrile[4] | — | 61 | — |
| 58% Chloroprene[5] | — | — | 43 |
| Dry solids basis | 25 | 25 | 25 |
| Antioxidant[6] | 0.5 | 0.5 | 0.5 |
| Water | 290 | 430 | 150 |
| (E) Coagulant-Aqueous Solution | | | |
| 2% Aluminum sulfate[7] | 140 | 115 | 110 |
| pH | 4.5 | 4.5 | 4.5 |
| (F) Combine (C) and (D) then add to (D) | | | |
| Blend and filter (X) | X | X | X |
| Silica in aqueous phase | none | none | none |
| (G) Masterbatch | | | |
| Dried (105°C.) (X) | X | X | X |

[1]A trademark product, N-tallow trimethylene diamine in isopropanol.
[3]Hycar 1570 X 20, a trademark product which is a carboxyl-modified butadiene/acrylonitrile latex.
[4]Hycar 1561, a trademark product which is a butadiene/acrylonitrile latex.
[5]Neoprene 635 latex, a trademark product.
[6]Antioxidant is 2,2-methylene-bis(4-methyl-6-t.-butylphenol).
[7]Aluminum sulfate = Al$_2$(SO$_4$)$_3$·14H$_2$O.

The level of amine employed in the foregoing Examples 1 to 15 and 25 to 27, of the order of 1–3 percent is sufficient to render the serum of the masterbatch essentially free of silica pigment. Vulcanizates prepared from the masterbatches so provided have improved tensile strength and only slightly decreased modulus as compared with similar vulcanizates prepared by dry milling. However, if the quantity of oleophilic amine material is increased significantly above the order of 1 percent based on the silica, by weight, e. g. into the range of 2 to 20 percent dry weight based on the silica, then the modulus of the vulcanizates of the masterbatches is reduced.

With respect to a further aspect of the invention, it is well known that if a silica pigment precipitated from an alkali metal silicate solution with the aid of carbon dioxide is dried in the alkaline state, it agglomerates to hard lumps which even after grinding do not uniformly disperse in dry rubber compositions. For this reason it has been the practice to render such silica pigment precipitates acidic, or at least neutral, e. g. by treatment with mineral acid or organic acids before drying the same, in order to render them dispersible. The present invention, as shown in Examples 16 to 20, has disclosed that such practice, and its disadvantages, can be obviated, and that a rubber dispersible dry alkaline silica pigment can be prepared, by treating the slurry of alkaline silica pigment precipitate with oleophilic amine material and then drying the same. The invention has further disclosed that when such amine is employed in sufficient quantity to render the dry silica pigment dispersible in dry rubber, and not significantly in excess of such quantity, the resulting dispersible alkaline dry silica pigment is useful for imparting high modulus to vulcanizate in which it is employed in normal compounding proportions. The invention has still further disclosed that by employing augmented amounts of such amine, significantly in excess of those which render the silica dispersible, a dry alkaline silica pigment may be obtained which is readily dispersible, and which does not itself impart high modulus to the stocks, but which does impart an improved balance of tensile strength and tear or abrasion resistance to the vulcanizate. And in this connection, the invention has further disclosed that a vulcanizate combining high modulus, high tensile strength and high tear or abrasion resistance, can be provided by employing a combination of dry alkaline silica pigment bearing such augmented amounts of such amine, together with other reinforcing fillers, e. g. carbon black, acidic silica pigments, and dry silica pigments having less than such augmented amounts of the oleophilic amine material.

Also the invention has disclosed that when, as in Examples 21 to 24, the alkaline silica pigment is treated with both the oleophilic amine material and with reactants selected from the class consisting of water soluble mineral and organic acids, water soluble salts of alkaline earth metals, aluminum or ainc, and combination of the foregoing, then dispersible dry alkaline, neutral or acidic silica pigments are obtainable suitable for rubber compounding, and that by use of augmented quantities of such amine, as aforesaid, such pigments are enabled to impart improved tear resistance to vulcanizates prepared therewith as above described.

EXAMPLES 28–36

Polymer-silica masterbatches may also be prepared containing processing oils and/or carbon black as previously described to obtain oil and/or carbon black containing elastomer-silica pigment masterbatches, without departing from the invention. In such practice, from 0 to 65 parts by weight of carbon black may be employed (with the limitation that the total quantity of treated pigment and carbon black, dry basis, not exceed 80 parts by weight, per 100 parts of the elastomers) and/or from 0 to 45 parts by weight of processing oil may be employed, by combining with the elastomer latex and silica pigment slurry prior to the coagulation thereof by the aqueous coagulant as set forth in the drawing. Such combinations may be effected in any suitable way, e. g. the carbon black may be added as an aqueous slurry and the processing oil as an aqueous dispersion preferably with an anionic and/or nonionic emulsifying agent and/or ammonium hydroxide.

In preferred embodiments of this invention, the oleophilic amine treated wet silica pigment being in a slurry form, the carbon black, and/or processing oil may be added directly to the said slurry without any prior aqueous dispersment, e. g. with the aid of a high shear mixer, such as a Waring blender to obtain a uniform dispersion of the combination.

The following Examples 28–38 are illustrative of such modes of practicing the invention.

TABLE X

Polymer-Silica Masterbatch

Including Carbon Black and/or Processiong Oil

| Example | 28 | 29 | 30 | 31 |
|---|---|---|---|---|
| (A) Silica Pigment Slurry | | | | |
| Alkaline silica pigment-I (pH 8.5–9.5) | 25 | 25 | 25 | 25 |
| Dry basis | 2.5 | 2.5 | 2.5 | 2.5 |
| Water | 15 | 15 | 15 | 15 |
| (B) Reagent-Aqueous Solution | | | | |
| 2% Sulfuric acid | 4.2 | 4.2 | 4.2 | 4.2 |
| (C) Combine (A) and (B) | | | | |
| Blend, filter and wash (X) | X | X | X | X |
| Silica pH 6.4–7.0 (X) | X | X | X | X |
| (D) Oleophilic Amine Material in Benzene | | | | |
| 5% Stearylamine[1] | 4.0 | — | — | — |
| 20% dicoco-amine[2] | — | 0.65 | — | — |
| 20% rosin amine [3] | — | — | 0.50 | 1.5 |
| (E) Combine (C) and (D) | X | X | X | X |
| (F) Carbon Black | | | | |
| Statex 160[4] | — | 2.5 | — | — |
| Philblack 0[4] | — | — | 5.0 | — |
| Thermax[4] | — | — | — | 7.5 |
| (G) Processing Oil | | | | |
| Sundex 2 X H[4] | 1 | — | — | 1 |
| (H) Combine (E), (F) and (G) (X) | X | X | X | X |
| (I) Other Ingredients | | | | |
| Water | 10 | 20 | 20 | 25 |
| (J) Add (I) to Blender, then (H) | | | | |
| Blender[5], min. | 0.5 | 0.5 | 0.5 | 0.5 |
| (K) Polymer Latex | | | | |
| Butadiene-styrene[6] | 20 | 51 | 76 | 102 |
| Dry solids basis | 4 | 10 | 15 | 20 |
| Antioxidant[7] | 0.08 | 0.2 | 0.45 | 0.6 |
| (L) Coagulant | | | | |
| 2% aluminum sulfate[8] | 18 | — | — | — |
| 2% zinc sulfate | — | 24 | — | — |
| 2% calcium chloride | — | — | 20 | — |
| 2% sulfuric acid | — | — | — | 10 |
| (M) Combine (J) (K) then (L) | | | | |
| Blend, (X) | X | X | X | X |
| Serum pH | 4.0 | 6.4 | 6.5 | 3.5 |
| Silica and/or black in serum | none | none | none | none |
| (N) Masterbatch | | | | |
| Filter and wash (X) | X | X | X | X |
| Dried (105°C.) (X) | X | X | X | X |

[1]Armeen T (a trademark product).
[2]Armeen 2C (a trademark product).
[3]Rosin Amine D (a trademark product).
[4]Trademark products.
[5]Waring Blender (a trademark product).
[6]SBR-1502 (T.S.=19.7%).
[7]Antioxidant is 2,2'-methylene-bis(4-methylene-6-t.butylphenol).
[8]Aluminum sulfate $Al_2(SO_4)_3 \cdot 14H_2O$.

TABLE XI

Polymer-Silica Masterbatch

Including Carbon Black

| | (Parts by wt.) | | | | |
|---|---|---|---|---|---|
| Example | 32 | 33 | 34 | 35 | 36 |
| (A) Silica Pigment Slurry | | | | | |
| Alkaline silica pigment -I (pH 8.5–9.5) | 21 | 21 | 21 | 21 | 21 |
| Dry solids basis | 2.5 | 2.5 | 2.5 | 2.5 | 2.5 |
| (B) Reagent-Aqueous Solution | | | | | |
| 2% aluminum sulfate[1] | 18.5 | — | — | — | — |
| 2% calcium chloride | — | 5.0 | — | — | — |
| 2% magnesium sulfate | — | — | 5.1 | — | — |
| Water | 26 | 45 | 12 | 15 | 15 |
| (C) Oleophilic Amine | | | | | |

| Material | | | | | |
|---|---|---|---|---|---|
| 20% Rosin amine[2] | 1.0 | — | — | — | — |
| Cocoamine[3] | — | 0.15 | — | — | — |
| 20% Dicocoamine[4] | — | — | 1.0 | — | — |
| N-tallow-1,3-propylene diamine reacted with ethylene oxide[5] | — | — | — | 0.2 | 0.2 |
| (D) Combine (A) and (B) then (C) | | | | | |
| Blend[6], min. | 0.5 | 0.5 | 0.5 | 0.5 | 0.5 |
| (E) Carbon Black | | | | | |
| Thermax[7] | 5 | — | — | — | — |
| Philblack 0[7] | — | 5 | 5 | 5 | 5 |
| (F) Combine (D) & (E) | | | | | |
| Blend[6], min. | 0.5 | 0.5 | 0.5 | 0.5 | 0.5 |
| (G) Polymer Latex | | | | | |
| Polychloroprene[8] | 26 | — | — | — | — |
| Butadiene-acrylonitrile[9] | — | 37 | — | — | — |
| Butadiene-styrene[10] | — | — | 82 | 82 | 82 |
| Dry basis | 15 | 15 | 15 | 15 | 15 |
| Antioxidant[11] | 0.3 | 0.3 | 0.3 | 0.3 | 0.3 |
| Water | 78 | 55 | 20 | 20 | 20 |
| Isopropanol* (coagulating aid) | 50 | — | — | — | — |
| (H) Combine (F) and (G), (X) | X[12] | X | X | X | X |
| (I) Coagulant-Aqueous Solution | | | | | |
| 2% Calcium chloride | — | 20 | — | — | — |
| 2% Magnesium sulfate | — | — | 40 | — | — |
| 2% Aluminum sulfate[1] | — | — | — | 34 | — |
| 2% Sulfuric acid | — | — | — | — | 11 |
| 12% Sodium chloride | — | — | — | — | 72 |
| (J) Combine (H) and (I) | | | | | |
| Blend, (X) | — | X | X | X | X |
| Serum pH | — | 7.0 | 7.5 | 4.0 | 3.0 |
| Silica and/or black in serum | — | none | none | none | none |
| (K) Masterbatch | | | | | |
| Filter and Wash (X) | X | X | X | X | X |
| Dried (105°C.) (X) | X | X | X | X | X |

[1]Aluminum sulfate $Al_2(SO_4)_3 \cdot 14H_2O$.
[2]Rosin Amine D. (a trademark product) in benzene.
[3]Armeen C (a trademark product)
[4]Armeen 2C (a trademark product) in benzene.
[5]Ethoduomeen T-25 (a trademark product) containing 15 moles of ethylene oxide per mole of diamine.
[6]Waring blender (a trademark product).
[7]Trademark product.
[8]Neoprene 635 (58% solids latex), a trademark product.
[9]Hycar 1561 (41% solids latex), a trademark product.
[10]SBR-1502 (18.4% solids latex).
[11]Antioxidant is 2,2'-methylene-bis(4-methylene-6-t.butylphenol).
[12]The combining was through a mixing nozzle; serum pH was 4 and serum was devoid of silica and carbon black.
*Premixed with the water.

TABLE XII

Polymer-Silica Masterbatch

Including Carbon Black (Parts by wt.)

| Example | 37 | 38 |
|---|---|---|
| (A) Silica Pigment Slurry | | |
| Alkaline silica pigment-I (pH 8.5–9.5) | 41 | 41 |
| Dry solids basis | 5 | 5 |
| (B) Reagent-Aqueous Solution | | |
| 20% Acetic acid | 5 | 5 |
| (C) Oleophilic Amine Material | | |
| 20% Rosin amine[1] in benzene | 2 | 2 |
| 6% aqueous ammonia | — | 16 |
| Water | 40 | 140 |
| (D) Combine (A) and (B) then (C) | | |
| Blend[3], min. | 0.5 | 0.5 |
| (E) Carbon Black | | |
| Thermax[2] | 10 | 10 |
| (F) Combine (D) and (E) | | |
| Blend[3], min. | 0.5 | 0.5 |
| (G) Polymer Latex | | |
| Polychloroprene[4] | 52 | 52 |
| Dry basis | 30 | 30 |
| Antioxidant[5] | 0.6 | 0.6 |
| Water | 52 | 150 |
| 50% Aqueous isopropanol (coagulating aid) | 100 | — |
| (H) Combine (F) and (G) | | |
| Blend (X)[3] | X[6] | — |
| Silica and/or black in serum | none | — |
| (I) Coagulant | | |
| 2% Aqueous acetic acid | — | 40 |
| Isopropanol | — | 200 |
| Water | — | 100 |
| (J) Combine (H) and (I) | | |
| Blend, (X) | — | X |
| Silica and/or black in serum | — | none |
| (K) Masterbatch | | |
| Filter and wash (X) | X | X |
| Dried (105°C.) (X) | X | X |

[1]Rosin Amine D (a trademark product)
[2]Trademark product.
[3]Waring blender.
[4]Neoprene 635 (58% solids latex), a trademark product.
[5]Antioxidant is 2,2'-methylene-bis(4-methylene-6-t.butylphenol).
[6]Concurrently feed (F) and (G) together and coagulation takes place to form masterbatch.

The masterbatches prepared in accordance with the present invention may be compounded with vulcanizing ingredients and vulcanized by any suitable recipe (e. g. the recipe set forth in Table I, above) to form useful vulcanizates.

From the foregoing disclosure, it will be appreciated, inter alia, that the present invention improves elastomer-silica pigment masterbatches by employing silica pigments combined with specified materials.

In certain co-pending applications filed on July 16, 1970 different modes of improving elastomer-silica pigment masterbatches are provided by employing elastomers supplied with certain substituent groups improving the ability of the elastomers to be latex masterbatched with the aqueously wet silica pigments.

To maintain clear lines of division between the copending applications, the claims of this application recite, and rely for patentability on, only its own improvements, without prejudice to their applicability to processes or products employing such improvements along with a different improvement disclosed in one of said co-pending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A process for the curbing of silica pigment losses and the promotion of uniformity of product in the preparation of a silica pigment-elastomer masterbatch from a. aqueously wet, hydrated silica pigment which has a bound alkali content, calculated as $Na_2O$, in the range of 0.1 to 10 percent by weight, dry basis, and which has been prepared by precipitation from an aqueous solution of sodium silicate with the aid of carbon dioxide, followed by filtering and washing, and which has been continuously maintained in an aqueously wet state after its precipitation, and b. an aqueous dispersion of rubbery addition polymer of ethylenically unsaturated monomer of two to 20 carbon atoms, said dispersion containing, for each 100 parts by weight of said polymer, from 0.5 to 15 parts by weight of anionic dispersing agent for the polymer, which method comprises the following steps:

1. combining said wet pigment with from 0.1 to 20 percent, based on the dry weight of the silica pigment, of oleophilic amine having at least one hydrocarbon or halohydrocarbon substituent that contains at least eight carbon atoms, thereby providing an amine-treated, wet pigment,
2. mixing together (i) said amine-treated, wet pigment, (ii) a sufficient amount of said aqueous dispersion of rubbery polymer to provide from five to 75 parts of said pigment (calculated on the basis of the dry weight of the pigment prior to the amine treatment) for each 100 parts by weight of said polymer, (iii) from 0 to 65 parts, for each 100 parts by weight of said polymer, of carbon black, with the limitation that the total of said silica pigment and carbon black, dry basis, not exceed 80 parts per each 100 parts by weight of said polymer, (iv) from 0 to 45 parts, for each 100 parts by weight of said polymer, of processing oil, and (v) sufficient coagulating agent selected from the group consisting of water soluble acids and water soluble aluminum, zinc, and alkaline earth metal salts to cause coagulation of the solids of the mix, thereby providing a silica pigment-elastomer coagulum in an aqueous serum that is essentially free of silica pigment, and
3. recovering said coagulum as a masterbatch.

2. The process of claim 1, wherein the aqueously wet, alkaline silica pigment, prior to being combined in step (1) with said oleophilic amine, is combined with reactant selected from the group consisting of water soluble acids, water soluble aluminum, zinc, and alkaline earth metal salts, and combinations of the foregoing to lower the alkaline content of the silica pigment.

3. The process of claim 1, wherein the aqueously wet, alkaline silica pigment, while being combined in step (1) with said oleophilic amine, is also combined with reactant selected from the group consisting of water soluble acids, water soluble aluminum, zinc, and alkaline earth metal salts, and combinations of the foregoing to lower the alkaline content of the silica pigment.

4. The process of claim 1, wherein step (2) is performed by combining the amine-treated pigment with at least a portion of the coagulating agent, so as to lower the alkaline content of the silica pigment, before combining the pigment with the aqueous polymer dispersion.

5. A process as claimed in claim 1, in which step (2) is performed by pre-mixing the aqueous dispersion of polymer with the amine-treated wet silica pigment, and thereafter combining such mixture with the coagulating agent.

6. A process as claimed in claim 5, in which the combining of the mixture of aqueous dispersion of polymer and amine-treated wet silica pigment with the coagulating agent is effected by adding said mixture to an aqueous solution of the coagulating agent.

7. A process as claimed in claim 1, wherein the quantity of amine used in step (1) is at least 0.5 percent by weight, based on the dry weight of the silica pigment.

8. A process as claimed in claim 1, wherein at least 5 parts by weight of the carbon black, for each 100 parts of polymer, is used in step (2).

9. A process as claimed in claim 1, wherein at least 5 parts by weight of processing oil, for each 100 parts of polymer, is used in step (2).

10. A process as claimed in claim 8, wherein at least 5 parts by weight of processing oil, for each 100 parts of polymer, is used in step (2).

11. A process as claimed in claim 1, wherein the amine contains eight to 108 carbon atoms.

12. A process as claimed in claim 11, wherein the amine contains at least one aliphatic hydrocarbon substituent having at least eight carbon atoms, and no substituents having more than 36 carbon atoms.

* * * * *